United States Patent
Sekii (10) Patent No.: US 11,990,812 B2
(45) Date of Patent: May 21, 2024

(54) ROUTING STRUCTURE OF CONDUCTIVE WIRE, MOTOR, RESOLVER, AND METHOD FOR MANUFACTURING ELECTRONIC DEVICE

(71) Applicant: NIDEC CORPORATION, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/881,603

(22) Filed: Aug. 5, 2022

(65) Prior Publication Data

US 2023/0037663 A1    Feb. 9, 2023

(30) Foreign Application Priority Data

Aug. 6, 2021    (JP) .................. 2021-129612

(51) Int. Cl.
| | |
|---|---|
| *H02K 3/28* | (2006.01) |
| *H02K 1/16* | (2006.01) |
| *H02K 3/12* | (2006.01) |
| *H02K 3/34* | (2006.01) |
| *H02K 15/10* | (2006.01) |

(52) U.S. Cl.
CPC ............... *H02K 3/28* (2013.01); *H02K 1/165* (2013.01); *H02K 3/12* (2013.01); *H02K 3/34* (2013.01); *H02K 15/105* (2013.01)

(58) Field of Classification Search
CPC ............ H02K 1/16; H02K 1/165; H02K 3/12; H02K 3/28; H02K 3/34; H02K 3/345; H02K 15/105
USPC .......................................................... 310/179
See application file for complete search history.

(56) References Cited

U.S. PATENT DOCUMENTS

| | | | |
|---|---|---|---|
| 9,742,232 B2 | 8/2017 | Honda et al. | |
| 2005/0206264 A1* | 9/2005 | Yamamoto ............. | H02K 13/04 310/195 |
| 2013/0313927 A1* | 11/2013 | Laber ..................... | H02K 3/522 310/50 |
| 2015/0035397 A1* | 2/2015 | Okinaga .................. | H02K 3/18 310/71 |
| 2015/0137634 A1* | 5/2015 | Kurita ................ | H02K 15/0062 29/598 |
| 2017/0126085 A1* | 5/2017 | Kim ....................... | H02K 3/522 |
| 2017/0268904 A1* | 9/2017 | Ozaki .................... | H02K 24/00 |
| 2018/0034354 A1* | 2/2018 | Niwa ........................ | H02K 9/06 |
| 2020/0021160 A1* | 1/2020 | Kuratani .................. | H02K 5/08 |
| 2020/0052545 A1* | 2/2020 | Park ....................... | H02K 3/522 |

* cited by examiner

*Primary Examiner* — Rashad H Johnson
(74) *Attorney, Agent, or Firm* — HAUPTMAN HAM, LLP

(57) ABSTRACT

A routing structure of a conductive wire includes: a body portion; a guide portion fixed to the body portion and including a protruding portion protruding to an outside of the body portion; a conductive wire hooked on the protruding portion of the guide portion; and a first insulating portion disposed between the body portion and the guide portion and insulating the body portion and the guide portion.

17 Claims, 8 Drawing Sheets

ROUTING STRUCTURE OF CONDUCTIVE WIRE, MOTOR, RESOLVER, AND METHOD FOR MANUFACTURING ELECTRONIC DEVICE

CROSS-REFERENCE TO RELATED APPLICATIONS

The present invention claims priority under 35 U.S.C. § 119 to Japanese Patent Application No. 2021-129612 filed on Aug. 6, 2021, the entire content of which is incorporated herein by reference.

FIELD OF THE INVENTION

The present disclosure relates to a routing structure of a conductive wire for routing a conductive wire, a motor and a resolver using the routing structure, and a method for manufacturing an electronic device using the routing structure of the conductive wire.

BACKGROUND

A conventional stator includes a conductive wire locking portion protruding in the axial direction at an end portion in the axial direction of an insulator attached to a core of the stator. The conductive wire provided in the stator is routed through the conductive wire locking portion.

In the conventional stator, the conductive wire locking portion is integrally formed with the insulator which is a resin molded body, and the structure of the insulator having the conductive wire locking portion becomes complicated. Therefore, there is a possibility that the manufacturing of the insulator becomes complicated.

SUMMARY

An exemplary routing structure of a conductive wire of the present disclosure includes: a body portion; a guide portion fixed to the body portion and including a protruding portion protruding to an outside of the body portion; a conductive wire hooked on the protruding portion of the guide portion; and a first insulating portion disposed between the body portion and the guide portion and insulating the body portion and the guide portion.

An exemplary routing structure of a conductive wire of the present disclosure includes: a body portion; a guide portion fixed to the body portion and including a protruding portion protruding to an outside of the body portion; and a conductive wire hooked on the protruding portion of the guide portion. The guide portion is formed of an insulating material.

An exemplary method for manufacturing an electronic device according to the present disclosure includes: in an electronic device having: a body portion; a guide portion fixed to the body portion and including a protruding portion protruding to an outside of the body portion; and a conductive wire hooked on a portion protruding from the body portion of the guide portion, forming a first insulting portion that insulates at least a part of the guide portion from the body portion; disposing the first insulating portion between the guide portion and the body portion to dispose the guide portion in the body portion; hooking the conductive wire on the guide portion; and pressing and fixing the guide portion from the body portion to a fixing position protruding by a length longer than a radius of the conductive wire.

The above and other elements, features, steps, characteristics and advantages of the present disclosure will become more apparent from the following detailed description of the preferred embodiments with reference to the attached drawings.

DETAILED DESCRIPTION

An exemplary embodiment of the present disclosure will be described in detail with reference to the drawings. In the present embodiment, a state in which a conductive wire 30 is wired on the upper surface of the body portion 10 will be described as an example, but the present invention is not limited thereto. For example, it may be wired to the side surface of the body portion 10 or may be wired to the bottom surface.

Figure 1:
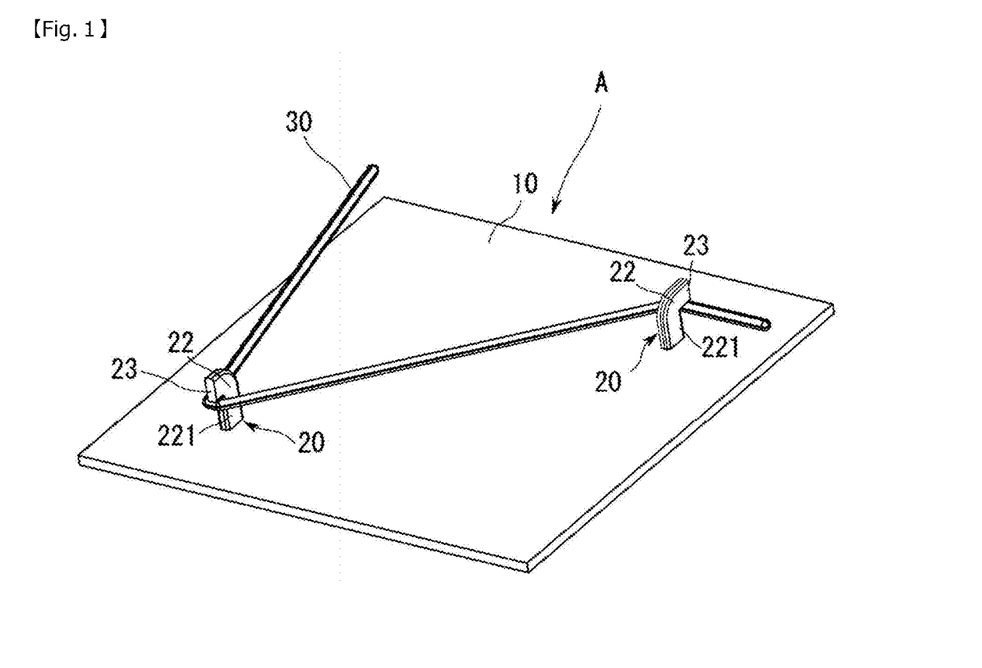
FIG. 1 is a schematic perspective view of a routing structure of a conductive wire according to the present disclosure.
Figure 2:
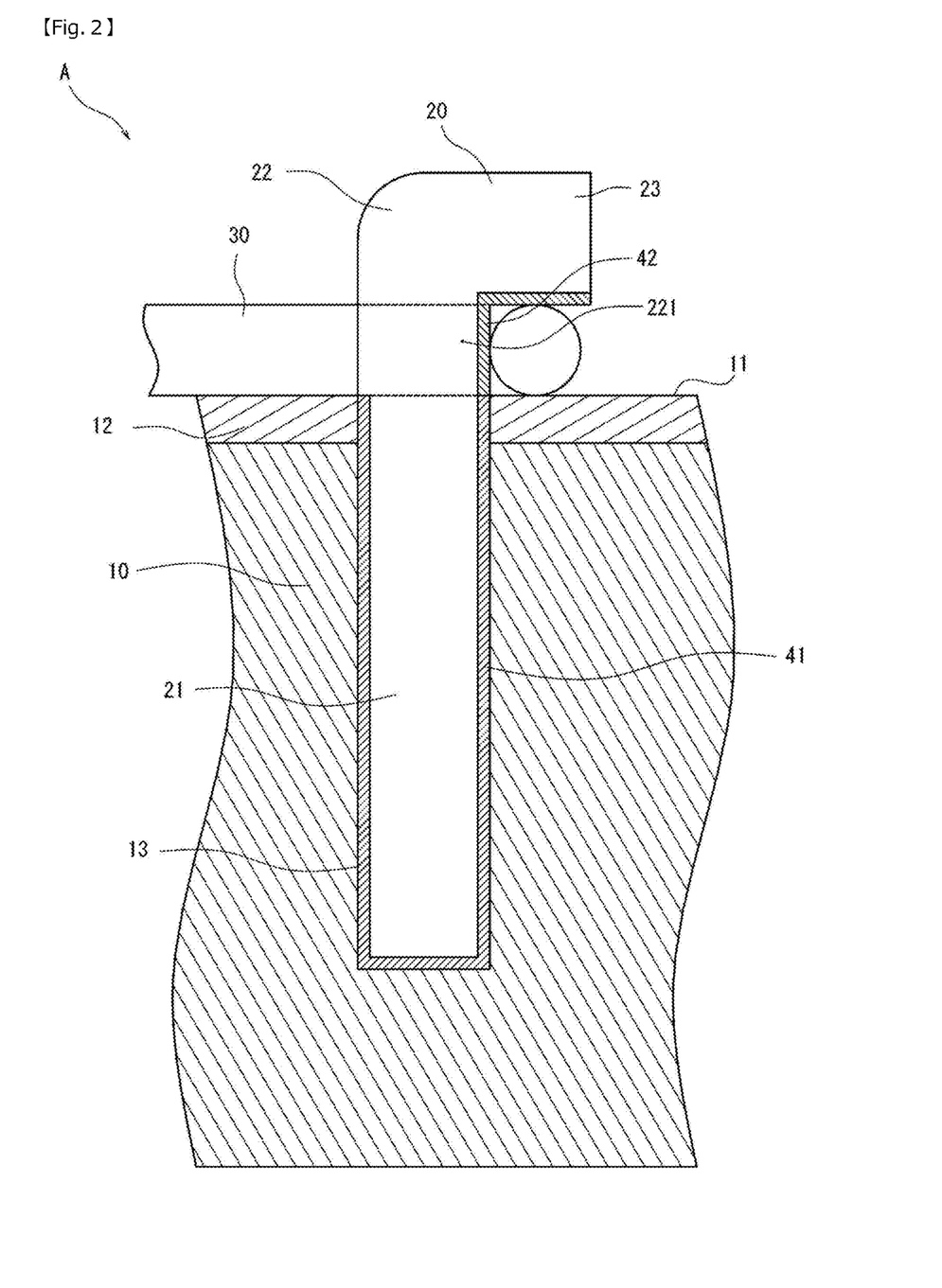
FIG. 2 is a cross-sectional view of a guide portion of the routing structure of the conductive wire illustrated in FIG. 1.

An exemplary embodiment of the present disclosure will be described with reference to the accompanying drawings. FIG. 1 is a schematic perspective view of a routing structure A of a conductive wire according to the present disclosure. FIG. 2 is a cross-sectional view of a guide portion 20 of the routing structure A of the conductive wire illustrated in FIG. 1.

The routing structure A of the conductive wire illustrated in FIG. 1 is a structure for wiring the conductive wire 30 on an upper surface 11 of the body portion 10. As illustrated in FIG. 2, the routing structure A includes the body portion 10, the guide portion 20, the conductive wire 30, a first insulating portion 41, and a second insulating portion 42. In the routing structure A of the conductive wire, the conductive wire 30 is hooked on the guide portion 20 attached to the body portion 10 to wire the conductive wire 30.

The body portion 10 has conductivity, and is formed of, for example, metal such as iron or aluminum. The conductive wire 30 is wired along the upper surface 11 of the body portion 10. At this time, in order to suppress a short circuit between the body portion 10 and the conductive wire 30, an insulating film 12 is disposed on the upper surface 11 of the body portion 10. The body portion 10 has a guide hole 13 opened in the upper surface 11. The guide portion 20 is inserted into the guide hole 13 and disposed in the body portion 10. That is, the body portion 10 has the guide hole 13 into which the guide portion 20 is inserted. With such a configuration, it is easy to attach the guide portion 20 to the body portion 10.

In the routing structure A of the conductive wire of the present embodiment, the distance from the upper surface 11 to the bottom surface of the guide hole 13 is equal to the length of a fixing portion 21 described later. In this way, it is possible to position the guide portion 20 in the axial direction when the guide portion is attached. The present invention is not limited to this configuration, and the distance from the upper surface 11 to the bottom surface of the guide hole 13 may be longer than the length of the fixing portion 21. Furthermore, the guide hole 13 may be a through-hole penetrating from the upper surface 11 to the lower surface (not illustrated) of the body portion 10. In this way, for example, when the body portion 10 is formed by laminating electromagnetic steel sheets in the axial direction, two types of steel sheets, a steel sheet with a hole and a steel sheet without a hole, may not be used to form the guide hole 13. That is, the number of types of steel sheets can be reduced.

The guide portion 20 is a member that supports the conductive wire 30. The guide portion 20 has conductivity, is formed of, for example, metal such as iron or aluminum, and has constant rigidity. As illustrated in FIG. 2, the guide portion 20 is an elongated member extending vertically. The guide portion 20 includes an elongated fixing portion 21 and a protruding portion 22 provided at an upper end of the fixing portion 21. The protruding portion 22 is formed integrally with the fixing portion 21.

The fixing portion 21 is press-fitted into the guide hole 13 formed in the body portion 10. As a result, the guide portion 20 is fixed to the body portion 10. The fixing of the guide portion 20 to the body portion 10 is not limited to press-fitting of the fixing portion 21 into the guide hole 13, and a fixing method such as bonding, welding, adhesion, or caulking may be adopted. A fixing method capable of firmly fixing the guide portion 20 to the body portion 10 can be widely adopted.

By press-fitting the fixing portion 21 into the guide hole 13, the protruding portion 22 protrudes to the upper portion of the body portion 10. That is, the guide portion 20 has the protruding portion 22 protruding to the outside of the body portion 10.

The conductive wire 30 is a wiring member that forms a circuit for supplying power, an electric signal, and the like. As illustrated in FIGS. 1 and 2, the conductive wire 30 is hooked on the protruding portion 22 of the guide portion 20. Usually, an insulating film (not illustrated) is formed on the outer surface of the conductive wire 30.

The first insulating portion 41 is disposed between the body portion 10 and the guide portion 20. The first insulating portion 41 insulates the body portion 10 from the guide portion 20.

In the routing structure A of the conductive wire according to the present embodiment, a plurality of (two) guide portions 20 are disposed at intervals in the body portion 10. The conductive wire 30 is hooked on the protruding portion 22 protruding to the outside of the body portion 10 of the guide portion 20. Accordingly, the conductive wire 30 is wired with a constant tension.

The routing structure A of the conductive wire is a structure in which the guide portion 20 is press-fitted and fixed into the guide hole 13 of the body portion 10, and has a simple structure as compared with a case where a protrusion for hooking the conductive wire 30 is formed on the body portion 10. That is, it is not necessary to form a complicated fixing structure in the body portion 10, and it is easy to process the guide portion 20 and the guide portion 20 in the body portion 10.

The first insulating portion 41 insulates the body portion 10 from the guide portion 20. The insulating film on the surface of the conductive wire 30 is rubbed and peeled off by the guide portion 20, and the guide portion 20 and the conductive wire 30 may be in a conductive state. Even in this case, since the guide portion 20 and the body portion 10 are insulated, it is possible to suppress the current from the conductive wire 30 from leaking to the body portion 10.

Examples of the first insulating portion 41 include an insulating resin, a paint, and the like. For example, the first insulating portion 41 is formed on the surface of the guide portion 20. More specifically, the first insulating portion 41 covers the surface of the fixing portion 21 inserted into the guide hole 13 of the guide portion 20.

With such a configuration, since the first insulating portion 41 is formed in the guide portion 20 having a smaller surface area than the body portion 10, processing of the first insulating portion 41 is easy.

As illustrated in FIG. 2, the protruding portion 22 has a hook portion 23 extending along the upper surface of the body portion 10. That is, the protruding portion 22 includes the hook portion 23 extending in a direction intersecting the protruding direction from the tip in the protruding direction with respect to the body portion 10.

By including the hook portion 23, when the conductive wire 30 is hooked on the protruding portion 22 of the guide portion 20, it is possible to suppress the conductive wire 30 from coming off from the upper end of the guide portion 20. That is, the conductive wire 30 can be prevented from falling off from the protruding portion 22. When the guide portion 20 is pushed and fixed, the guide portion 20 is pushed with the conductive wire 30 sandwiched between the hook portion 23 and the body portion 10, whereby the guide portion 20 can be positioned in the pushing direction. That is, the guide portion 20 can be disposed at an appropriate position with respect to the body portion 10.

As illustrated in FIG. 2, the protruding portion 22 has a contact portion 221 in contact with the conductive wire 30. The second insulating portion 42 is formed in the contact portion 221. The second insulating portion 42 insulates the guide portion 20 from the conductive wire 30. That is, the protruding portion 22 of the guide portion 20 includes the contact portion 221 in contact with the conductive wire 30. The guide portion 20 includes the second insulating portion 42 that covers at least the contact portion 221 and insulates the conductive wire 30 and the guide portion 20 from each other.

As described above, since the second insulating portion 42 is formed in the contact portion 221 of the guide portion 20 that is smaller than the body portion 10, processing is easy. Insulation between the conductive wire 30 and the guide portion 20 can be more effectively performed, and leakage of a current from the conductive wire 30 to the body portion 10 can be further suppressed.

As illustrated in FIG. 2, the contact portion 221 is provided on a side of the protruding portion 22 from which the hook portion 23 protrudes. With this configuration, when the conductive wire 30 is brought into contact with the contact portion 221, the movement of the conductive wire 30 in the vertical direction is restricted by the hook portion 23, so that the conductive wire 30 is hardly detached from the guide portion 20.

The second insulating portion 42 is in direct contact with the conductive wire 30. In order to prevent the conductive wire 30 from being rubbed and the insulating film of the conductive wire 30 from being peeled off, the second insulating portion 42 may be formed of a material softer than the first insulating portion 41. Even when the first insulating portion 41 and the second insulating portion 42 are formed of the same member, the surface may be formed in a smooth curved surface shape by forming the second insulating portion 42 thicker than the first insulating portion 41.

The first insulating portion 41 and the second insulating portion 42 may be a single member. By configuring the first insulating portion 41 and the second insulating portion 42 with a single member in this manner, the first insulating portion 41 and the second insulating portion 42 can be formed in one step. As a result, the number of processing steps can be reduced.

The routing structure A of the conductive wire according to the present embodiment has the above-described configuration. Next, a manufacturing process of the routing structure A of the conductive wire will be described with reference to the drawings.

Figure 3:
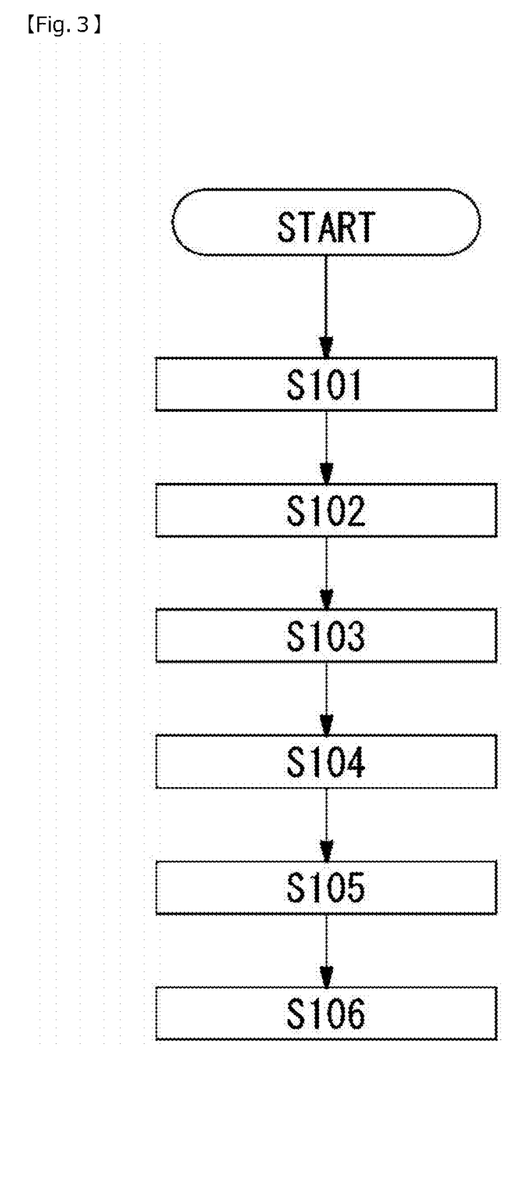
FIG. 3 is a flowchart illustrating a manufacturing process of the routing structure of the conductive wire.

FIG. 3 is a flowchart illustrating a manufacturing process of the routing structure of the conductive wire. As illustrated in FIG. 3, a guide hole 13 is formed in the body portion 10 in which the insulating film 12 is disposed on the upper surface 11 (guide hole forming step: S101). The guide hole 13 is provided at a position where the conductive wire 30 can be routed with a constant tension in accordance with the routing channel of the conductive wire 30. More specifically, the guide hole 13 is provided in the bent portion of the conductive wire 30 to be routed.

Then, an insulating material is applied to the surface of the fixing portion 21 of the guide portion 20 to form the first insulating portion 41 (First insulating step: S102). That is, in the first insulating step S102, the first insulating portion 41 that insulates at least a part of the guide portion 20 from the body portion 10 is formed. In the present embodiment, the first insulating portion 41 is formed in the guide portion 20, but the present invention is not limited thereto. For example, the first insulating portion 41 may be formed directly in the guide hole 13 of the body portion 10, or may be formed as a member different from both the body portion 10 and the guide portion 20.

Thereafter, an insulating material is applied to the protruding portion 22 of the guide portion 20 to form the second insulating portion 42 (second insulating step: S103). The second insulating portion 42 does not need to cover the protruding portion 22, and may be configured to cover at least the contact portion 221 which is a portion of the protruding portion 22 with which at least the conductive wire 30 is in contact. That is, in the second insulating step S103, the second insulating portion 42 that insulates the guide portion 20 from the conductive wire 30 is formed in the portion (the contact portion 221) of the guide portion 20 that is in contact with the conductive wire 30.

That is, at least one of the first insulating step S102 and the second insulating step S103 is a step of forming an insulation layer on the surface of the guide portion 20. It is easy to manufacture the first insulating portion 41 and the second insulating portion 42. In the present embodiment, the second insulating portion 42 is formed in the guide portion 20, but the present invention is not limited thereto. For example, the second insulating portion 42 may be formed as a member different from the guide portion 20 and fixed to the guide portion 20.

The first insulating step S102 and the second insulating step S103 may be reversed in terms of process, or may be performed in one process.

Figure 4:
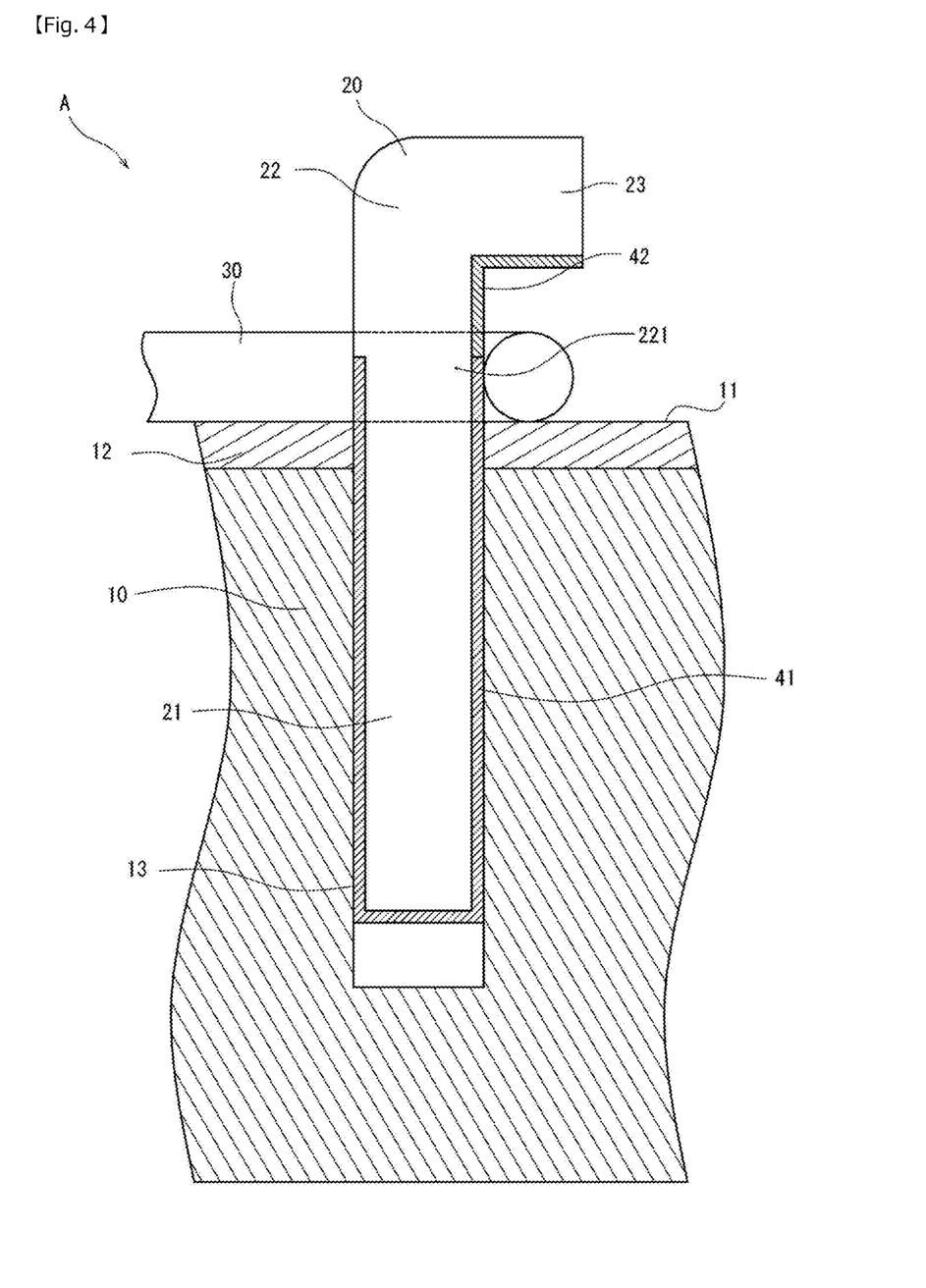
FIG. 4 is a cross-sectional view of a state in which the guide portion is inserted into a guide hole.

FIG. 4 is a cross-sectional view of a state in which the guide portion 20 is inserted into the guide hole 13. As illustrated in FIG. 4, the fixing portion 21 of the guide portion 20 in which the first insulating portion 41 and the second insulating portion 42 are formed is inserted into the guide hole 13 of the body portion 10 (guide portion disposing step: S104). The guide portion 20 is held by the body portion 10 and can be pushed into the body portion 10. At this time, the first insulating portion 41 is interposed between the body portion 10 and the guide portion 20. That is, in the guide portion disposing step S104, the first insulating portion 41 is disposed between the guide portion 20 and the body portion 10, and the guide portion 20 is disposed on the body portion 10.

The conductive wire 30 is hooked on the guide portion 20 held by the body portion 10 (hooking step S105). At this time, the conductive wire 30 comes into contact with the contact portion 221 formed on the side where the hook portion 23 of the protruding portion 22 of the guide portion 20 protrudes. When a predetermined tension acts on the conductive wire 30, the conductive wire 30 is pressed against the contact portion 221. Accordingly, the conductive wire 30 is disposed so as not to exceed the hook portion 23, and the conductive wire 30 is prevented from being detached. That is, in the hooking step S105, the conductive wire 30 is hooked on the guide portion 20.

After the conductive wire 30 is completely hooked to the predetermined guide portion 20, the guide portion 20 is pushed into the body portion 10 (pushing step: S106). When the guide portion 20 is pushed into the body portion 10, the fixing portion 21 of guide portion 20 is press-fitted into the guide hole 13. As a result, the guide portion 20 is fixed to the body portion 10. In the pressing step S106, the guide portion 20 may be pressed and then fixed using a fixing method such as bonding, welding, adhesion, or caulking instead of press-fitting.

In the routing structure A of the conductive wire of the present embodiment, the guide portion 20 includes the hook portion 23. Therefore, when the guide portion 20 is pushed, it is possible to push until the hook portion 23 comes into contact with the upper portion of the conductive wire 30. As described above, the hook portion 23 comes into contact with the upper portion of the conductive wire 30, so that the conductive wire 30 is less likely to move around. Since the hook portion 23 comes into contact with the conductive wire 30, the conductive wire 30 is sandwiched between the body portion 10 and the hook portion 23 when the guide portion 20 is pushed, and the guide portion 20 can be positioned in the vertical direction.

The guide portion 20 without the hook portion 23 may be used. In such a case, a length L1 (see FIG. 5) of the portion of the protruding portion 22 protruding from the upper surface 11 of the body portion 10 is longer than a radius r1 (see FIG. 5) of the conductive wire 30. With such a configuration, it is possible to suppress detachment of the conductive wire 30 from the upper portion of the protruding portion 22. That is, in the pushing step S106, the guide portion 20 is pushed and fixed to a fixing position protruding from the body portion 10 by the length L1 or more longer than the radius r1 of the conductive wire 30.

The guide portion 20 is disposed on the body portion 10, the conductive wire 30 is hooked on the guide portion 20, the conductive wire 30 is routed, and then the guide portion 20 is pushed into the body portion 10 and fixed. With such a configuration, when the conductive wire 30 is routed, the conductive wire 30 is easily routed because the portion disposed on the upper portion of the body portion 10 of the guide portion 20 is large.

Figure 5:
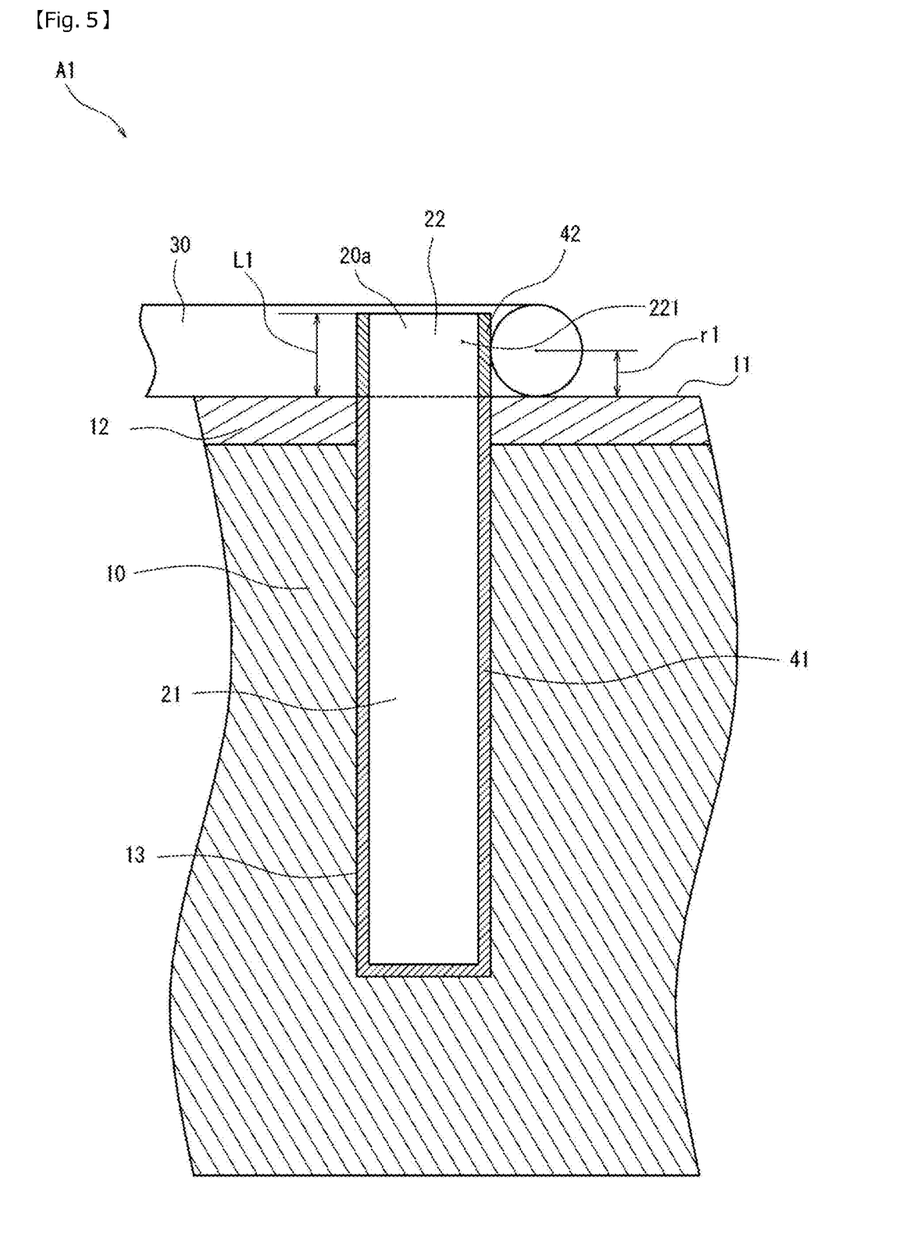
FIG. 5 is a cross-sectional view of a routing structure of a conductive wire having another example of a guide portion.

FIG. 5 is a cross-sectional view of a routing structure A1 of the conductive wire including a guide portion 20a. As illustrated in FIG. 5, the guide portion 20a is different from the guide portion 20 illustrated in FIG. 2 in that the protruding portion does not include the hook portion 23. The other points of the guide portion 20a are the same as those of the guide portion 20. Therefore, the same portions of the guide portion 20a as those of the guide portion 20 are denoted by the same reference numerals, and the detailed description of the same portions is omitted.

As illustrated in FIG. 5, the guide portion 20a has a protruding portion 22a protruding upward from the upper surface 11 of the body portion 10. The length L1 of the protruding portion 22a protruding upward from the upper surface 11 is longer than the radius r1 of the conductive wire 30. That is, the guide portion 20a is fixed at a fixing position P1 where the protruding length L1 of the protruding portion 22a is longer than the radius r1 of the conductive wire 30.

With such a configuration, even if the conductive wire 30 is biased toward the contact portion 221 of the protruding portion 22a by the tension acting on the conductive wire, the conductive wire 30 is less likely to move upward. Therefore, the conductive wire 30 is less likely to come off upward from the guide portion 20a. The upper end of the contact portion 221 may have an inclination to contact the upper portion of the conductive wire 30. With this configuration, when the conductive wire 30 is biased toward the contact portion 221, the conductive wire 30 is biased toward the body portion 10. Accordingly, the detachment of the conductive wire 30 can be further suppressed.

Figure 6:
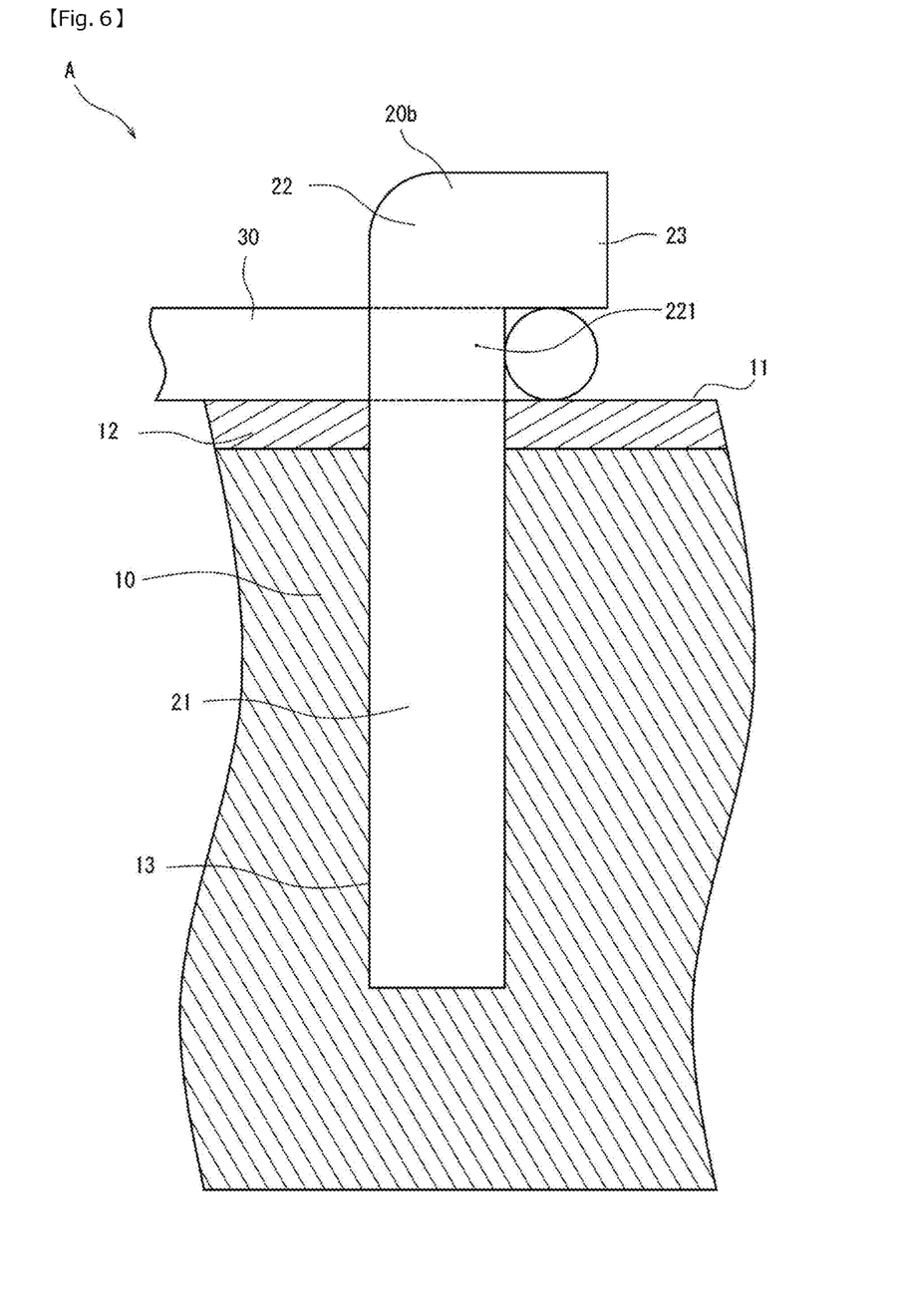
FIG. 6 is a cross-sectional view of still another example of the guide portion.

As illustrated in FIG. 6, a guide portion 20b is formed of an insulating member such as ceramics, and the first insulating portion 41 and the second insulating portion 42 (see FIG. 2) may be omitted. That is, the guide portion 20b may be formed of an insulating material. With such a configuration, it is easy to manufacture the guide portion 20b.

Figure 7:
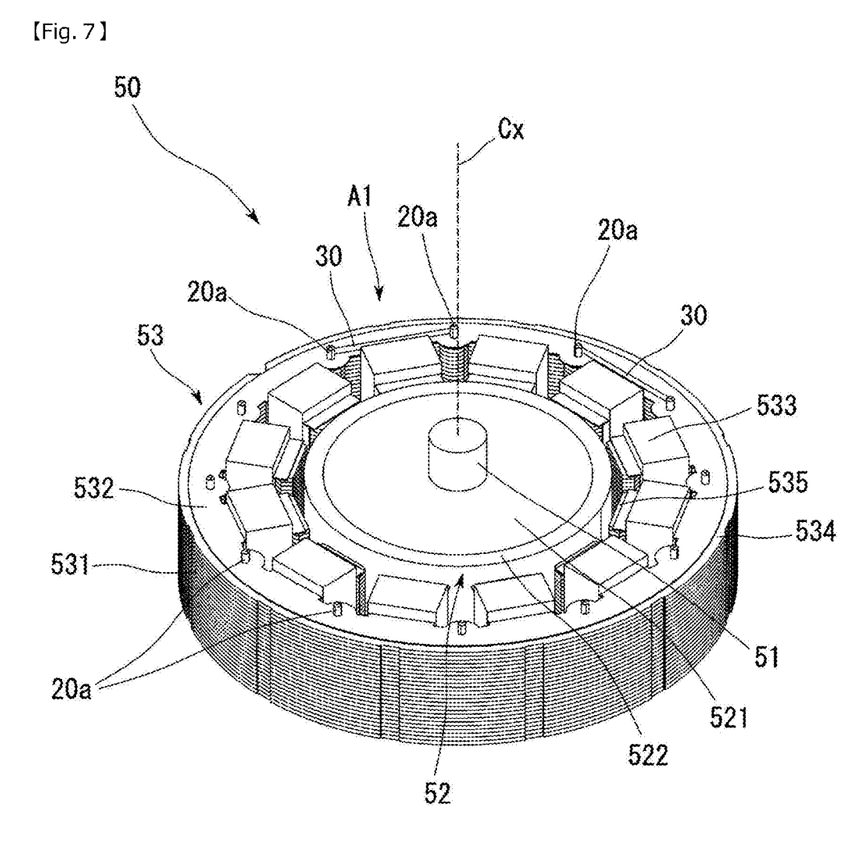
FIG. 7 is a perspective view of a motor according to an embodiment of the present disclosure.

FIG. 7 is a perspective view of a motor 50 according to an embodiment of the present invention. In the description of the motor 50, a direction in which a center axis Cx extends will be described as an axial direction, a direction intersecting the center axis Cx will be described as a radial direction, and a direction along a circumference centered on the center axis Cx will be described as a circumferential direction. The upper and lower sides are based on the state illustrated in FIG. 7. The vertical direction is set for ease of description, and is not limited to this state.

As illustrated in FIG. 7, the motor 50 includes a shaft 51, a rotor 52, and a stator 53.

The shaft 51 has a columnar shape extending along the center axis Cx. The shaft 51 is disposed so as to be rotatable about the center axis Cx.

The rotor 52 includes a rotor core 521 and a rotor magnet 522. The rotor core 521 has a columnar shape extending along the center axis Cx, and the shaft 51 passes through the center. The shaft 51 is fixed to the rotor core 521. The rotor magnet 522 has an annular shape and is fixed to the outer peripheral surface of the rotor core 521. In the rotor magnet 522, N poles and S poles are alternately magnetized in the circumferential direction.

The stator 53 includes a stator core 531, an insulating sheet 532, a coil 533, a guide portion 20a, and a conductive wire 30. The stator core 531 is formed by laminating electromagnetic steel plates in the axial direction. The stator core 531 is annular and extends along the center axis Cx. The stator core 531 is disposed radially outward of the rotor 52.

The stator core 531 includes a core back 534 and teeth 535. The core back 534 has an annular shape. The teeth 535 protrude radially inward from the inner peripheral surface of the core back 534. The axially inner tips of the teeth 535 radially face the rotor 52.

The insulating sheet 532 is disposed on an outer surface of the stator core 531. The coil 533 is formed by winding a magnet wire around the teeth 535 surrounded by the insulating sheet 532. By supplying a current to the coil 533 via the conductive wire 30, the coil 533 is excited, and the rotor 52 and the shaft 51 to which the rotor 52 is fixed rotate.

The motor 50 is a DC brushless motor. Therefore, three-phase currents having different phases are supplied to the coil 533. As a result, the coil 533 disposed in the stator 53 is connected by the conductive wire 30 for each phase of the supplied current.

As illustrated in FIG. 7, the guide portion 20a similar to the guide portion 20 illustrated in FIGS. 1 to 6 is disposed on the upper surface of the stator 53. That is, the motor 50 has the routing structure A1 of the conductive wire 30 in which the stator core 531 of the stator 53 is the body portion 10 (see FIG. 1). Then, the conductive wire 30 connecting the coils 533 is hooked on the guide portion 20a, and the conductive wire 30 is routed on the upper surface of the stator core 531 of the stator 53. At this time, the conductive wire 30 is hardly detached. Therefore, contact between the rotor 52 and the conductive wire 30 is suppressed.

With the configuration in which the guide portion 20a is inserted into and fixed to the stator core 531, the shape of the stator 53 can be simplified, and the axial length of the stator 53 can be shortened. As a result, the motor 50 can be downsized.

Figure 8:
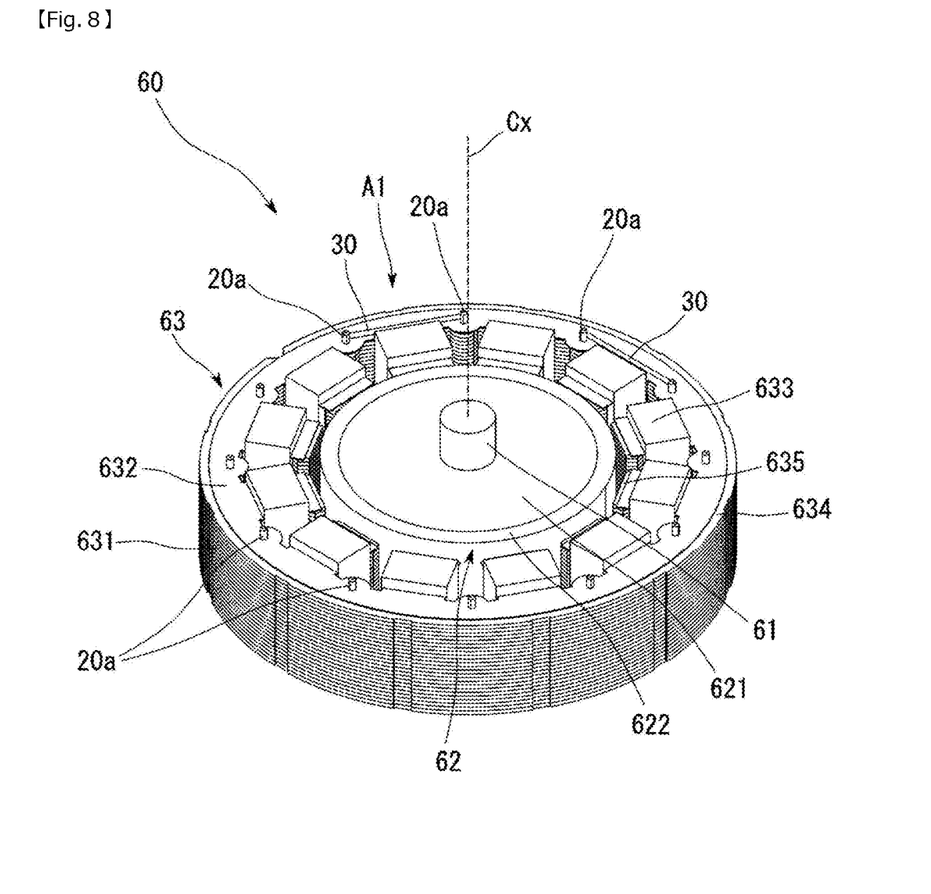
FIG. 8 is a perspective view of a resolver according to an aspect of the present disclosure.

FIG. 8 is a perspective view of a resolver 60 according to an embodiment of the present invention. In the description of the resolver 60, a direction in which the center axis Cx extends is referred to as an axial direction, a direction intersecting the center axis Cx is referred to as a radial direction, and a direction along a circumference centered on the center axis Cx is referred to as a circumferential direction. The upper and lower sides are based on the state illustrated in FIG. 8. The vertical direction is set for ease of description, and is not limited to this state.

The resolver 60 is a detection device that detects rotation of a shaft 61 such as a motor. As illustrated in FIG. 8, the resolver 60 includes the shaft 61, a resolver rotor 62, and a resolver stator 63. The resolver 60 has the same configuration as the motor 50. That is, the shaft 61 corresponds to the shaft 51 of the motor 50.

The resolver rotor 62 corresponds to the rotor 52 of the motor 50. More specifically, a rotor core 621 and a rotor magnet 622 of the resolver rotor 62 correspond to the rotor core 521 and the rotor magnet 522 of the rotor 52 of the motor 50.

The resolver stator 63 is disposed radially outward of the resolver rotor 62. The resolver stator 63 corresponds to the stator 53 of the motor 50. More specifically, a stator core 631, an insulating sheet 632, a coil 633, a core back 634, teeth 635, the guide portion 20a, and the conductive wire 30 correspond to the stator core 531, the insulating sheet 532, the coil 533, the core back 534, the teeth 535, the guide portion 20a, and the conductive wire 30 of the stator 53 of the motor 50.

In the resolver 60, the shaft 61 is rotated by a separately provided power source. The rotation of the shaft 61 rotates the resolver rotor 62 to excite the rotor magnet 622 and the coil 633 of the resolver stator 63. The electromotive force generated by this is detected, and the rotation angle of the shaft 61 is detected.

As illustrated in FIG. 8, the guide portion 20a similar to the guide portion 20 illustrated in FIGS. 1 to 6 is disposed on the upper surface of resolver stator 63. That is, the resolver 60 has the routing structure A1 of the conductive wire 30 in which the stator core 631 of the resolver stator 63 is used as the body portion 10 (see FIG. 1). Then, the conductive wire 30 connecting the coils 633 is hooked on the guide portion 20a, and the conductive wire 30 is routed on the upper surface of the stator core 631 of the resolver stator 63. At this time, the conductive wire 30 is hardly detached. Therefore, contact between the resolver rotor 62 and the conductive wire 30 is suppressed.

By configuring the guide portion 20a to be inserted into and fixed to the stator core 631, the shape of the resolver stator 63 can be simplified, and the length of the resolver stator 63 in the axial direction can be shortened. Consequently, the resolver 60 can be downsized, and the electronic device in which the resolver 60 is disposed can be downsized.

The present disclosure can be used as, for example, a motor and a resolver.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A routing structure of a conductive wire, comprising:
a conductive body portion;
a conductive guide portion fixed to the body portion and including a protruding portion protruding to an outside of the body portion;
a conductive wire hooked on the protruding portion of the guide portion; and
a first insulating portion that is disposed between the body portion and the guide portion and insulates the body portion from the guide portion, wherein
the protruding portion of the guide portion includes a contact portion that comes into contact with the conductive wire, and
the guide portion includes a second insulating portion that covers at least the contact portion and insulates the conductive wire and the guide portion.

2. The routing structure of the conductive wire according to claim 1, wherein
the first insulating portion is formed on a surface of the guide portion.

3. The routing structure of the conductive wire according to claim 1, wherein
the first insulating portion and the second insulating portion are a single member.

4. The routing structure of the conductive wire according to claim 1, wherein
the protruding portion includes a hook portion extending as facing with the body portion from a tip in the protruding portion.

5. The routing structure of the conductive wire according to claim 1, wherein
the body portion has a guide hole into which the guide portion is inserted.

6. A motor having the routing structure of the conductive wire according to claim 1, wherein
the body portion is a stator core.

7. A resolver having the routing structure of the conductive wire according to claim 1, wherein
the body portion is a stator core.

8. A method for manufacturing an electronic device, the method comprising:
in an electronic device having:
a body portion;
a guide portion fixed to the body portion and including a protruding portion protruding to an outside of the body portion; and
a conductive wire hooked on the protruding portion from the body portion of the guide portion,
forming a first insulting portion that insulates the guide portion in an area of contact with the body portion;
disposing the first insulating portion between the guide portion and the body portion to dispose the guide portion in the body portion;
hooking the conductive wire on the guide portion; and
pressing and fixing the guide portion from the body portion to a fixing position protruding by a length longer than a radius of the conductive wire.

9. The method for manufacturing an electronic device according to claim 8, comprising:
forming a second insulating portion that insulates the guide portion from the conductive wire at a portion of the guide portion in contact with the conductive wire.

10. The method for manufacturing an electronic device according to claim 9, wherein
at least one of the forming of the first insulating portion and the forming of the second insulating portion is forming an insulation layer on a surface of the guide portion.

11. A routing structure of a conductive wire, comprising:
a conductive body portion;
a conductive guide portion fixed to the body portion and including a protruding portion protruding to an outside of the body portion;
a conductive wire hooked on the protruding portion of the guide portion; and
a first insulating portion that is disposed between the body portion and the guide portion and insulates the body portion from the guide portion, wherein
the body portion has a guide hole into which the guide portion is inserted.

12. The routing structure of the conductive wire according to claim 11, wherein
the first insulating portion is formed on a surface of the guide portion.

13. The routing structure of the conductive wire according to claim 11, wherein
the first insulating portion and the second insulating portion are a single member.

14. The routing structure of the conductive wire according to claim 11, wherein
the protruding portion includes a hook portion extending as facing with the body portion from a tip in the protruding portion.

15. The routing structure of the conductive wire according to claim 11, wherein
the body portion has a guide hole into which the guide portion is inserted.

16. A motor having the routing structure of the conductive wire according to claim 11, wherein
the body portion is a stator core.

17. A resolver having the routing structure of the conductive wire according to claim 11, wherein
the body portion is a stator core.

\* \* \* \* \*